May 19, 1936. F. B. THOMAS 2,041,307
FLUID PRESSURE BRAKE
Filed Jan. 25, 1933
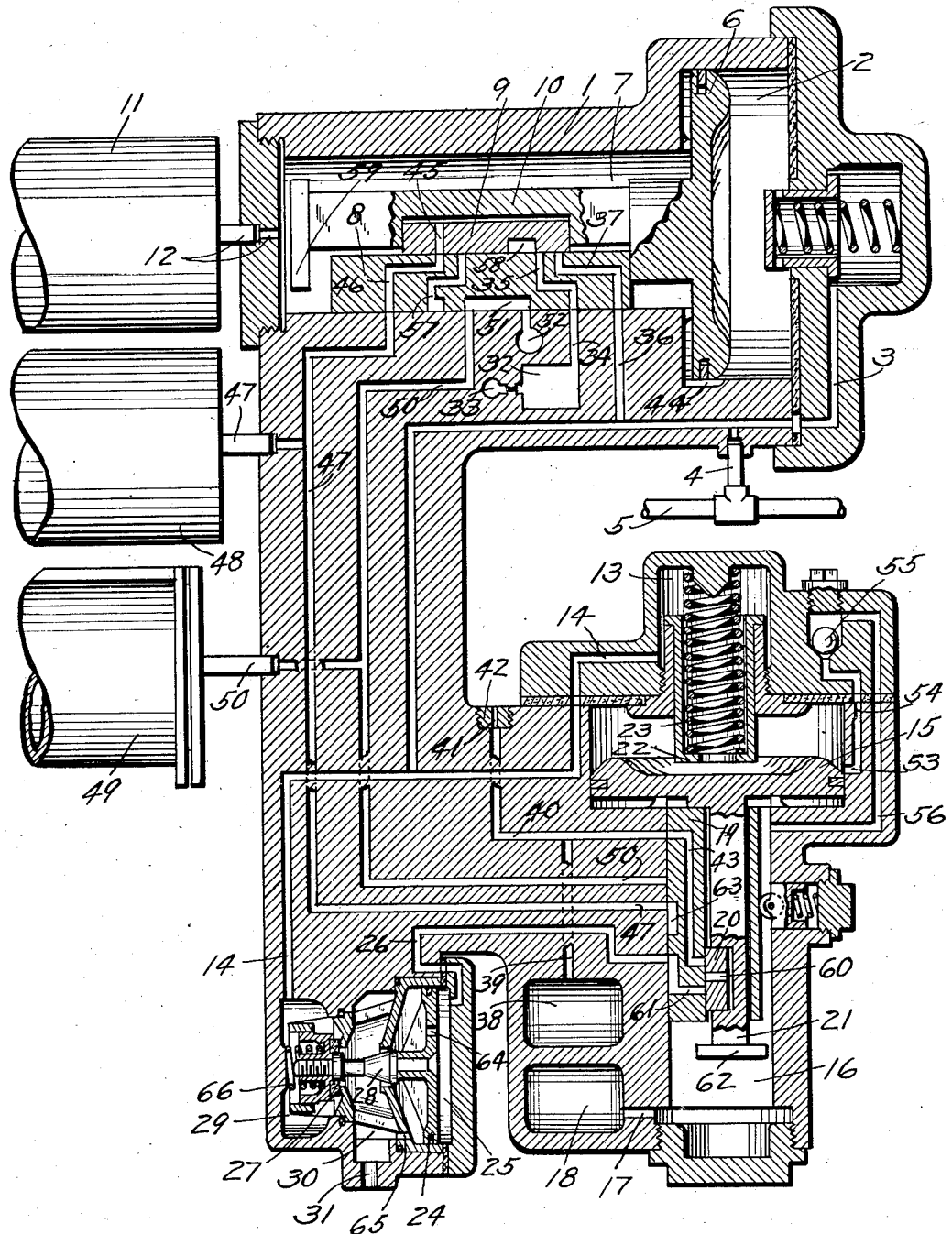
INVENTOR.
FRANK B. THOMAS
BY *Wm. M. Cady*
ATTORNEY.

Patented May 19, 1936

2,041,307

UNITED STATES PATENT OFFICE 2,041,307

FLUID PRESSURE BRAKE

Frank B. Thomas, Irwin, Pa., assignor to The Westinghouse Air Brake Company, Wilmerding, Pa., a corporation of Pennsylvania Application January 25, 1933, Serial No. 653,445

29 Claims. (Cl. 303—42)

This invention relates to fluid pressure brake equipment and more particularly to the controlling valve mechanism of an automatic fluid pressure brake system which operates upon a reduction in brake pipe pressure for effecting an application of the brakes and upon an increase in brake pipe pressure to effect the release of the brakes.

The principal object of my invention is to provide a brake controlling valve mechanism of the above type with means for preventing the mechanism from operating to effect an emergency application of the brakes, when in effecting a service application of the brakes, the brake pipe pressure is reduced at a rate approaching or even equalling an emergency rate of reduction, provided the reduction at such a rate does not exceed a predetermined amount.

Other objects and advantages will appear in the following more detailed description of the invention.

In the accompanying drawing, the single figure is a central sectional view of a fluid pressure brake controlling apparatus embodying my invention and showing the several parts of the apparatus in normal release position.

The brake controlling valve mechanism may comprise a casing 1, having a triple valve portion, an emergency valve portion and a quick action valve device.

The triple valve portion has a piston chamber 2 connected through a passage 3 and pipe 4 with the usual brake pipe 5, and containing a piston 6 which is subject to the opposing pressures of the brake pipe and a valve chamber 7.

In valve chamber 7 are mounted a main slide valve 8 and a graduating slide valve 9, adapted to be operated by piston 6 through the medium of a piston stem 10. The usual auxiliary reservoir 11 is connected, through a passage and pipe 12, to valve chamber 7.

The emergency portion has a piston chamber 13, connected through a passage 14, with the brake pipe passage 3 and containing a piston 15. This emergency portion also has a valve chamber 16 which is in constant communication through a passage 17 with a quick action chamber 18 and which contains slide valves 19 and 20 adapted to be operated by the piston 15 through the medium of a piston stem 21, the slide valve 20 being mounted on and having movement relative to the slide valve 19.

A stop member 22, subject to the pressure of a coil spring 23, opposes outward movement of the emergency piston 15, when, in effecting an application of the brakes, said piston has initially moved out a short distance. This operation will be hereinafter more fully described.

The quick action valve device may comprise a piston 24, at one side of which there is a piston chamber 25 which is connected to a passage 26, leading to the seat of the emergency main slide valve 19. A vent valve 27 is operatively connected to the piston 24 through the medium of a stem 28, said vent valve being contained in a valve chamber 29 and being operative by the piston 24 to control communication from the chamber 29 to a chamber 30 open to the atmosphere through a port 31. The brake pipe passage 3 and emergency piston chamber 13 are open, through passage 14, to the vent valve chamber 29.

A quick service chamber or bulb 32 may be formed in the casing 1 which may be constantly open, through a restricted passage 33, to the atmosphere and which, with the triple valve parts in their normal release position, as shown in the drawing, is open, through a passage 34, to a port 35 in the main slide valve 8, leading to the seat of the graduating slide valve 9. The brake pipe passage 3 is open, through a branch passage 36, to a port 37, in the main slide valve 8, leading to the seat of the graduating slide valve. The graduating valve 9 in release position laps the ports 35 and 37.

A reduction chamber or bulb 38 may also be formed in the casing 1, which bulb is constantly open to the atmosphere through passages 39 and 40 and a restricting passage 41 in a choke plug 42 having screw-threaded connection with the casing 1. With the several parts of the emergency valve device in release position, as shown in the drawing, the passage 40 is open to a port 43, in the emergency main slide valve 19, leading to the seat of the auxiliary slide valve 20, said slide valve 20 lapping the port 43.

In operation, when fluid under pressure is supplied to the brake pipe 5 in the usual manner, fluid flows through passage 3 to the triple valve piston chamber 2, and with the triple valve piston 6 in release position, as shown in the drawing, fluid flows from piston chamber 2, through the usual feed groove 44, to the valve chamber 7 and auxiliary reservoir 11.

In the release position of the triple valve device, fluid flows from valve chamber 7, through a port 45 in the graduating slide valve 9, a port 46 in the main slide valve 8, and passage and pipe 47, to a supplemental or emergency reservoir 48, so that said reservoir is charged at the pressure carried in the brake pipe.

Further, in the release position of the triple valve device, the usual brake cylinder 49 is open to the atmosphere by way of a pipe and passage 50, a cavity 51 in the main slide valve 8 and an exhaust passage 52.

Fluid under pressure supplied from the brake pipe 5 to the brake pipe passage 3 flows therefrom, through passage 14, to piston chamber 13 of the emergency valve device, and from the piston chamber 13 flows through a passage 53, having a restricted flow portion 54, past a check valve 55 and through a passage 56 to the emergency valve chamber 16 and quick action chamber 18, thus the chambers 16 and 18 are charged with fluid at brake pipe pressure.

To initiate a service application of the brakes, the brake pipe pressure is reduced at a service rate in the usual well known manner through the operation of the engineer's brake valve device (not shown). Since, as hereinbefore described, the brake pipe 5 is in communication with the triple valve piston chamber 2 and with the emergency piston chamber 13, the pressure of fluid in these chambers reduces with the brake pipe pressure.

Upon thus reducing the pressure of fluid in the piston chamber 2, the pressure of fluid in the valve chamber 7 causes the triple valve piston 6 to move outwardly toward application position, and, through the medium of the piston stem 10, shifts the graduating slide valve 9 relative to the main slide valve 8. As the graduating slide valve is thus shifted, it laps the port 46 in the main slide valve 8, thus closing the communication between the valve chamber 7 and the emergency reservoir 48. Following the lapping of the port 46, the triple valve piston 6 closes the feed groove 44, so as to prevent back flow of fluid from the valve chamber 7 to the piston chamber 2.

After the feed groove 44 is thus closed, the continued movement of the graduating slide valve 9 brings the port 45 into registration with a service port 57 in the main slide valve 8 and also brings a cavity 58 in the graduating valve into connecting relation with the ports 37 and 35.

With a communication from the port 37 to the port 35 thus established by the cavity 58, and with the ports 37 and 35 in registration with the passages 36 and 34, respectively, as hereinbefore described, fluid under pressure is permitted to flow from the brake pipe 5 to the quick service bulb 32, and from thence is permitted to flow to the atmosphere through the restricted passage 33.

The local quick service flow of fluid from the brake pipe to the quick service bulb is at a fast rate until the brake pipe pressure substantially equalizes into the bulb and then continues at a slower rate as governed by the restricted passage 33. The initial flow of fluid to the bulb 32 produces a sudden limited quick reduction in pressure in the brake pipe 5 for hastening the operation of the triple valve device on the next car in a train. The triple valve device on said next car then operates in a similar manner, and in this way, a quick serial response to the brake pipe reduction is propagated throughout the length of the train.

After this sudden limited reduction in brake pipe pressure has been effected by the flow of fluid to the quick service bulb 32, the quick service reduction is adapted to continue at a slower rate through the restricted passage 33. This continued reduction is for the purpose of insuring movement of the local triple valve parts to application position.

When the piston 6 and graduating slide valve 9 move to quick service position, a lug 59, carried by the piston stem 10, is brought into engagement with the rear end surface of the main slide valve 8, so that upon further movement of the piston toward application position, the main slide valve will be shifted in the same direction.

The main valve 8, as its movement is continued, laps the passage 35, closing off the further quick service flow of fluid from the brake pipe to the bulb 32. At substantially the same time as the passage 35 is lapped, the service port 57 which is in registration with the port 45 in the graduating valve, is brought into registration with the passage 50, so that fluid under pressure now flows from the valve chamber 7 and connected auxiliary reservoir 11 to the brake cylinder, thus a service application of the brakes is effected.

The emergency piston 15 is also moved outwardly from the position in which it is shown in the drawing upon the reduction in brake pipe pressure at a service rate until the auxiliary slide valve 20 has been shifted, relative to the main slide valve 19, a sufficient distance that a port 60, in the auxiliary slide valve registers with the port 43 in the main slide valve. Since the port 43 is in registration with the passage 40, fluid under pressure is now vented from the valve chamber 16 and quick action chamber 18 to the reduction chamber 38 and to the atmosphere. The reduction in the pressure of fluid in the chambers 16 and 18 will be at a fast rate, i. e., at a rate at least equal to the rate of reduction in brake pipe pressure, until the pressure of fluid in these chambers equalizes into the reduction chamber 38, after which the reduction in pressure will be at a slower rate, i. e., at a rate substantially equal to the rate of reduction in brake pipe pressure obtaining after the rapid initial quick service reduction in brake pipe pressure has been effected, this final rate of reduction being governed by the flow of fluid as permitted by the choke plug 42. Further outward movement of the emergency piston is prevented by engagement of the piston with the yielding stop member 22.

When the pressure of fluid in valve chamber 16 and in the quick action chamber 18 has been reduced to a point slightly less than the reduced brake pipe pressure in piston chamber 13, the piston 15 will move the auxiliary slide valve 20 so as to lap the port 43.

When the usual engineer's brake valve (not shown) is turned to emergency position, the brake pipe pressure is reduced at a sudden or emergency rate, whereupon the triple valve piston moves out as in a service application, the triple valve device shown in the drawing being of the type in which the triple valve piston makes its full traverse in effecting both service and emergency applications of the brakes. As in a service application, fluid under pressure is supplied from the auxiliary reservoir to the brake cylinder through ports 45 and 57 in the graduating slide valve 9 and main slide valve 8, respectively, and through passage and pipe 50.

When the brake pipe pressure is reduced at an emergency rate, the several parts of the emergency valve device will move, as in a service application, to the position in which fluid under pressure is vented from the chamber 16 and quick action chamber 18 to the reduction chamber 38 and to the atmosphere. Now when the pressure of fluid in the chambers 16 and 18 equalizes into the reduction chamber 38 and the reduction in brake pipe pressure is continued at an emergency rate, i. e., at a rate faster than the service rate, at which fluid is vented from the valve chamber 16 and quick action chamber of the emergency valve device, through the restricting passage 41 of the choke plug 42, the piston 15 is caused to move out to emergency position, compressing the spring 23.

As the piston 15 is thus caused to move toward emergency position against the opposing pressure of the spring-pressed member 22, the piston, through the medium of its stem 21, shifts the auxiliary slide valve 20 relative to the main slide valve 19 so as to lap the port 43 to close off the further flow of fluid from the chambers 16 and 18 to the atmosphere by way of the passage 40 and passage 41 in the choke plug 42. When the auxiliary slide valve 20 laps the port 43, it also uncovers a port 61 in the main slide valve 19 and at substantially the same time as this port is fully uncovered, a lug 62 carried by the piston stem 21 engages the rear end of the main slide valve 19 and causes the slide valve to move to emergency position, in which position, passage 47 is connected, through a cavity 63, to the brake cylinder passage 50. Fluid under pressure is then supplied from the emergency reservoir 48 to the brake cylinder 49, in addition to the fluid supplied from the auxiliary reservoir 11 to the brake cylinder, so that a high pressure emergency application of the brakes is effected.

The port 61, which has been uncovered in the manner just described, is in open communication with the passage 26 leading to the piston chamber 25 of the quick action valve device, so that fluid under pressure flows from the valve chamber 16 to the piston chamber 25. The quick action piston 24 is then actuated, by the fluid under pressure supplied to the piston chamber 25, so that the vent valve 27 is unseated and fluid under pressure is vented from the brake pipe 5 to the atmosphere by way of pipe 4, passages 3 and 14, vent valve chamber 29, past the unseated vent valve 27, chamber 30 and atmospheric port 31, thus causing a local reduction in brake pipe pressure.

Fluid supplied to piston chamber 25, bleeds down to the atmosphere by flow through a port 64 in the quick action piston, a port 65, chamber 30 and port 31, and when the pressure in chamber 25 has been reduced nearly to atmospheric pressure, a spring 66, which has been compressed upon the unseating of the vent valve 27, acts to shift the vent valve to its seat, thus closing communication from the brake pipe to the atmosphere.

The reduction in pressure in the valve chamber 16, due to the flow of fluid therefrom to the atmosphere by way of the port 64 in the quick action piston, to substantially the reduced pressure in the brake pipe, permits the spring 23, acting through the medium of the member 22, to shift the emergency piston 15 back toward its normal position.

When the brake pipe pressure is increased to effect the release of the brakes after an emergency application, the emergency piston 15 and associated slide valves 19 and 20 as well as the triple valve piston 6 and associated slide valves 8 and 9 are moved inwardly to their normal positions as shown in the drawing, the emergency piston and emergency slide valves moving to their normal position in advance of the movement of the triple valve piston.

With the triple valve parts and emergency valve parts in their normal release positions, fluid under pressure is vented from the brake cylinder to release the brakes and the equipment is recharged in substantially the same manner as hereinbefore described.

It will be apparent from the foregoing description that by providing for a limited rapid reduction in emergency piston chamber pressure, when a service application of the brakes is being effected, the possibility of the emergency valve parts being accidentally shifted to emergency position is eliminated even though the local limited quick service reduction in brake pipe pressure to the quick service chamber 32 may cause the brake pipe pressure to reduce at a rate up to an emergency rate.

Thus far in this specification, I have described my invention as being embodied in a fluid pressure brake apparatus having quick service venting means of the vented bulb type, but I do not wish to be limited to this, for it will be understood that it may be embodied in fluid pressure brake apparatus having other types of quick service venting means or in fluid pressure brake apparatus not having quick service venting means and in which a rapid reduction in brake pipe pressure is desired to provide a quick serial propagation of a service application of the brakes. It will therefore be seen that, broadly, my invention comprises means for preventing a fluid pressure brake apparatus from operating to effect an emergency application of the brakes when, in effecting a service application of the brakes, the rate of reduction in brake pipe pressure may be faster than the usual service rate and the amount of reduction is limited.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a chamber normally charged with fluid under pressure, a brake controlling valve mechanism subject to the opposing pressures of the brake pipe and said chamber and operative upon a predetermined reduction in brake pipe pressure at an emergency rate to effect an emergency application of the brakes, and means operative to effect a limited reduction in the pressure of fluid in said chamber at an emergency rate to prevent the brake controlling valve mechanism from operating to effect an emergency application of the brakes when, in effecting a service application of the brakes, the brake pipe pressure is reduced at a rate exceeding a service rate, unless the reduction in brake pipe pressure at a rate exceeding a service rate continues after the limited reduction in the pressure of fluid in the chamber has been effected.

2. In a fluid pressure brake, the combination with a brake pipe, of a chamber normally charged with fluid under pressure, a brake controlling valve mechanism subject to the opposing pressures of the brake pipe and said chamber and operative upon a predetermined reduction in brake pipe pressure at an emergency rate to effect an emergency application of the brakes, and means controlled by the brake controlling valve mechanism for effecting a limited reduction in the pressure of fluid in said chamber at a rapid rate to prevent the brake controlling valve mechanism from operating to effect an emergency application of the brakes when, in effecting a service application of the brakes, the rate of reduction in brake pipe pressure exceeds the usual service rate unless the reduction in brake pipe pressure continues after the limited reduction in the pressure of fluid in said chamber is effected.

3. In a fluid pressure brake, the combination with a brake pipe, of a chamber normally charged with fluid under pressure, a brake controlling valve mechanism subject to the opposing pressures of the brake pipe and said chamber and operative upon a predetermined reduction in brake pipe pressure at an emergency rate to effect an emergency application of the brakes, a reduction limiting chamber, and means included in said brake controlling valve mechanism operative to vent fluid under pressure at a rapid rate from the normally charged chamber to the reduction limiting chamber to prevent the brake controlling valve mechanism from operating to effect an emergency application of the brakes when the brake pipe pressure is reduced at an emergency rate, unless a predetermined reduction in brake pipe pressure has been effected.

4. In a fluid pressure brake, the combination with a brake pipe, of a chamber normally charged with fluid under pressure, a brake controlling valve mechanism subject to the opposing pressures of the brake pipe and said chamber and operative upon a predetermined reduction in brake pipe pressure at an emergency rate to effect an emergency application of the brakes, a reduction limiting chamber, and means included in said brake controlling valve mechanism operative to vent fluid under pressure at a rapid rate from the normally charged chamber to the reduction limiting chamber to prevent the brake controlling valve mechanism from operating to effect an emergency application of the brakes when the brake pipe pressure is reduced at an emergency rate, unless the emergency rate of reduction in brake pipe pressure is continued after the pressure of fluid in the normally charged chamber has equalized into the reduction limiting chamber.

5. In a fluid pressure brake, the combination with a brake pipe, of a chamber normally charged with fluid under pressure, a brake controlling valve mechanism subject to the opposing pressures of the brake pipe and said chamber and operative upon a predetermined reduction in brake pipe pressure at an emergency rate to effect an emergency application of the brakes, a reduction limiting chamber into which fluid under pressure is adapted to be vented from the normally charged chamber to effect a predetermined reduction in the pressure of fluid in the normally charged chamber, and means operative to establish a communication through which fluid under pressure is vented at a rapid rate from the normally charged chamber to the reduction limiting chamber until the pressure of fluid in the normally charged chamber equalizes into the reduction limiting chamber for preventing the brake controlling valve mechanism from operating to effect an emergency application of the brakes when the brake pipe pressure is reduced at an emergency rate, unless the emergency rate of brake pipe reduction is continued after the equalization of the pressures of fluid in said chambers.

6. In a fluid pressure brake, the combination with a brake pipe and a brake cylinder, of an equalizing valve device operated upon a reduction in brake pipe pressure for supplying fluid under pressure to the brake cylinder in effecting either a service or an emergency application of the brakes, a quick action chamber normally charged with fluid under pressure, an emergency valve mechanism subject to the opposing pressures of the brake pipe and quick action chamber and operative upon a reduction in brake pipe pressure at an emergency rate to effect an emergency application of the brakes, and means for effecting a limited reduction in quick action chamber pressure at a rate at least as fast as the reduction in brake pipe pressure for preventing movement of the emergency valve mechanism to emergency application position when, in effecting a service application of the brakes, the brake pipe pressure is reduced at an emergency rate, unless the reduction in brake pipe pressure is continued until after the limited reduction in quick action chamber pressure has been effected.

7. In a fluid pressure brake, the combination with a brake pipe and a brake cylinder, of an equalizing valve device operated upon a reduction in brake pipe pressure for supplying fluid under pressure to the brake cylinder in effecting either a service or an emergency application of the brakes, a quick action chamber normally charged with fluid under pressure, an emergency valve mechanism subject to the opposing pressures of the brake pipe and quick action chamber, and operative upon a reduction in brake pipe pressure at an emergency rate to effect an emergency application of the brakes, and means operative to effect a predetermined reduction in quick action chamber pressure at a rapid rate for preventing movement of the emergency valve mechanism to emergency application position when, in effecting a service application of the brakes, the brake pipe pressure is reduced at an emergency rate, unless the reduction in brake pipe pressure at an emergency rate is continued until after the predetermined reduction in pressure of fluid in the quick action chamber has been effected.

8. In a fluid pressure brake, the combination with a brake pipe and a brake cylinder, of an equalizing valve device operated upon a reduction in brake pipe pressure for supplying fluid under pressure to the brake cylinder in effecting either a service or an emergency application of the brakes, a quick action chamber normally charged with fluid under pressure, an emergency valve mechanism subject to the opposing pressures of the brake pipe and quick action chamber and operative upon a reduction in brake pipe pressure at an emergency rate to effect an emergency application of the brakes, a reduction chamber constantly open to the atmosphere through a choked passage, and means operative to establish communication through which fluid under pressure is vented from the quick action chamber to the reduction chamber at an emergency rate until the pressure of fluid in the quick action chamber equalizes into the reduction chamber for preventing the emergency valve mechanism from operating to effect an emergency application of the brakes when the brake pipe pressure is reduced at an emergency rate, unless the reduction in brake pipe pressure at an emergency rate is continued after the equalization of the pressures of fluid in said chambers.

9. In a fluid pressure brake, the combination with a brake pipe and a brake cylinder, of an equalizing valve device operated upon a reduction in brake pipe pressure for supplying fluid under pressure to the brake cylinder in effecting either a service or an emergency application of the brakes, a quick action chamber normally charged with fluid under pressure, an emergency valve mechanism subject to the opposing pressures of the brake pipe and quick action chamber and operative upon a reduction in brake pipe pressure at an emergency rate to effect an emergency application of the brakes, a reduction chamber constantly open to the atmosphere through a choked passage, and means included in the emergency valve mechanism operative to establish communication through which fluid under pressure is vented from the quick action chamber to the reduction chamber at an emergency rate until the pressure of fluid in the quick action chamber equalizes into the reduction chamber for preventing the emergency valve mechanism from operating to effect an emergency application of the brakes when the brake pipe pressure is reduced at an emergency rate, unless the reduction in brake pipe pressure at an emergency rate is continued after the equalization of the pressures of fluid in said chambers.

10. In a fluid pressure brake, the combination with a brake pipe and a brake cylinder, of an equalizing valve device operated upon a reduction in brake pipe pressure for supplying fluid under pressure to the brake cylinder in effecting either a service or an emergency application of the brakes, a quick action chamber normally charged with fluid under pressure, an emergency valve mechanism subject to the opposing pressures of the brake pipe and quick action chamber and operative upon a reduction in brake pipe pressure at an emergency rate to effect an emergency application of the brakes, a reduction chamber constantly open to the atmosphere through a choked passage, and means included in the emergency valve mechanism and comprising a slide valve operative to establish communication through which fluid under pressure is vented from the quick action chamber to the reduction chamber at an emergency rate until the pressure of fluid in the quick action chamber equalizes into the reduction chamber for preventing the emergency valve mechanism from operating to effect an emergency application of the brakes when the brake pipe pressure is reduced at an emergency rate, unless the reduction in brake pipe pressure at an emergency rate is continued after the equalization of the pressures of fluid in said chambers.

11. In a fluid pressure brake, the combination with a brake pipe and a brake cylinder, of a brake controlling valve subject to brake pipe pressure and an opposing pressure device operative upon a reduction in brake pipe pressure at a service rate to locally vent fluid under pressure from the brake pipe and to supply fluid under pressure to the brake cylinder to effect a service application of the brakes and operative upon a reduction in brake pipe pressure at an emergency rate to supply fluid under pressure to the brake cylinder to effect an emergency application of the brakes, and means included in the brake controlling valve device operative in effecting a service application of the brakes for effecting a limited reduction in said opposing pressure at such a rate as to prevent the brake controlling valve device from operating to effect an emergency application of the brakes when, in effecting a service application of the brakes, the local venting of fluid from the brake pipe increases the rate of reduction in brake pipe pressure to an emergency rate, provided the reduction in brake pipe pressure does not exceed a predetermined amount.

12. In a fluid pressure brake, the combination with a brake pipe and a brake cylinder, of a brake controlling valve device subject to brake pipe pressure and an opposing pressure and operative upon a reduction in brake pipe pressure at a service rate to effect a limited local reduction in brake pipe pressure at a relatively fast rate and to supply fluid under pressure to the brake cylinder to effect a service application of the brakes and operative upon a reduction in brake pipe pressure at an emergency rate to supply fluid under pressure to the brake cylinder to effect an emergency application of the brakes, and means controlled by said brake controlling valve device in its movement to service application position to effect a limited reduction in said opposing pressure at such a rate as to prevent the brake controlling valve device from functioning to effect an emergency application of the brakes when, in effecting a service application of the brakes, the local reduction in brake pipe pressure causes the brake pipe pressure to reduce at an emergency rate.

13. In a fluid pressure brake, the combination with a brake pipe and a brake cylinder, of an equalizing valve device operated upon a reduction in brake pipe pressure at a service rate for first effecting a limited local quick service reduction in brake pipe pressure at a relatively fast rate and for then supplying fluid under pressure to the brake cylinder to effect a service application of the brakes, a quick action chamber normally charged with fluid under pressure, an emergency valve device subject to the opposing pressures of the brake pipe and quick action chamber, both the equalizing valve device and emergency valve device being operative upon a reduction in brake pipe pressure at an emergency rate to supply fluid under pressure to the brake cylinder to effect an emergency application of the brakes, a reduction chamber constantly open to the atmosphere through a choked passage, and means included in the emergency valve device operative to establish communication through which fluid under pressure is vented from the quick action chamber to the reduction chamber at an emergency rate until the quick action chamber pressure equalizes into the reduction chamber to prevent the emergency valve device from operating to emergency position when, in effecting a service application of the brakes, the local quick service reduction in brake pipe pressure causes the brake pipe pressure to reduce at a rate in excess of a service rate, said choked passage, after the equalization of the quick action chamber and reduction reservoir pressures, retarding the flow of fluid from said quick action chamber to permit the operation of the emergency valve device to emergency position when, to effect an emergency application of the brakes, a reduction in brake pipe pressure at an emergency rate is continued after the equalization of the quick action chamber and reduction reservoir pressures.

14. In a fluid pressure brake, the combination with a brake pipe, of a brake controlling valve device subject to brake pipe pressure and an opposing pressure movable to a service application position upon a reduction in brake pipe pressure and to an emergency application position upon a sufficiently rapid rate of reduction in brake pipe pressure, and means cooperating with the valve device in the service position of the valve device for effecting a limited reduction in said opposing pressure at such a rate as to prevent movement of the device to emergency application position when the reduction in brake pipe pressure at the rapid rate does not exceed a predetermined amount.

15. In a fluid pressure brake, the combination with a brake pipe, of a brake controlling valve device subject to brake pipe pressure and an opposing pressure and movable to a service application position upon a reduction in brake pipe pressure and to an emergency application position upon a sufficiently rapid rate of reduction in brake pipe pressure, and means cooperating with the valve device in the service position of the valve device for reducing said opposing pressure a limited amount to prevent movement of the device to emergency application position unless the reduction in brake pipe pressure at said rapid rate is continued after the brake pipe pressure has been reduced a chosen amount.

16. In a fluid pressure brake, the combination with a brake pipe, of a brake controlling valve device operative upon a gradual reduction in brake pipe pressure to first effect a local reduction in brake pipe pressure at a rate in excess of a service rate and to then effect a service application of the brakes and operative upon a sufficiently rapid reduction in brake pipe pressure for effecting an emergency application of the brakes, and means set in operation upon movement of the brake controlling valve device to service position for preventing the brake controlling valve device from operating to effect an emergency application of the brakes when in effecting a service application of the brakes the rate of reduction in brake pipe pressure is in excess of a service rate unless the reduction in brake pipe pressure at a rate in excess of a service rate continues beyond a predetermined amount.

17. In a fluid pressure brake, the combination with a brake pipe, of a brake controlling valve device operative upon a gradual reduction in brake pipe pressure to effect a local reduction in brake pipe pressure of a limited amount and at a rate greater than a service rate and to effect a service application of the brakes, and operative upon a reduction in brake pipe pressure at a rate greater than a service rate to effect an emergency application of the brakes, and means controlled by said brake controlling valve device for preventing the brake controlling valve device from operating to effect an emergency application of the brakes upon the local reduction in brake pipe pressure in effecting a service application of the brakes.

18. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, and means operating in the service position of the mechanism for reducing said opposing fluid pressure a limited amount at such a rate as to prevent a rate of reduction in brake pipe pressure in excess of a service rate from creating a sufficient pressure differential to move the mechanism to said emergency position until the brake pipe pressure has been reduced a predetermined amount.

19. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, and means operating in the service position of the mechanism for reducing said opposing fluid pressure a limited amount at a rate exceeding a service rate to prevent a rate of reduction in brake pipe pressure in excess of a service rate from creating a sufficient pressure differential to move the mechanism to said emergency position until the brake pipe pressure has been reduced a predetermined amount, said means also operating in the service position of the mechanism for preventing reduction in brake pipe pressure to any amount at a service rate from creating a sufficient pressure differential to move the mechanism to emergency position.

20. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, and means controlled by the mechanism for reducing said opposing fluid pressure at such a rate as to prevent a rate of reduction in brake pipe pressure in excess of a service rate from creating a sufficient pressure differential to move the mechanism to said emergency position until the brake pipe pressure has been reduced a predetermined amount.

21. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, and means operating in the service position of the mechanism for reducing said opposing fluid pressure a limited amount at a rate in excess of a service rate for preventing the rate of reduction in brake pipe pressure in excess of a service rate from creating a sufficient pressure differential to move the mechanism to said emergency position until the brake pipe pressure has been reduced a predetermined amount.

22. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, means operating in the service position of the mechanism for effecting a reduction in said opposing fluid pressure at a rate in excess of a service rate for preventing the rate of reduction in brake pipe pressure in excess of a service rate from creating a sufficient differential to move the mechanism to said emergency position, and means for limiting the amount of reduction in said opposing fluid pressure at a rate in excess of a service rate for insuring a sufficient pressure differential being created to move the mechanism to emergency position when the reduction in brake pipe pressure at a rate in excess of a service rate exceeds a predetermined amount.

23. In a fluid pressure brake, in combination, a brake pipe, a brake controlling valve mechanism subject to brake pipe pressure and an opposing fluid pressure and operative to a service application position upon the creation of a fluid pressure differential thereon by a reduction in brake pipe pressure at a service rate and operative to an emergency application position upon the creation of a sufficient fluid pressure differential thereon by a reduction in brake pipe pressure at a rate exceeding a service rate, means operating in the service position of the mechanism for effecting a reduction in said opposing fluid pressure at a rate in excess of a service rate for preventing the rate of reduction in brake pipe pressure in excess of a service rate from creating a sufficient differential to move the mechanism to said emergency position, means for limiting the amount of reduction in said opposing fluid pressure and the rate in excess of a service rate for insuring a sufficient pressure differential being created to move the mechanism to emergency position when the reduction in brake pipe pressure at a rate in excess of a service rate exceeds a predetermined amount, and means for retarding the rate of reduction in said opposing fluid pressure when said limited reduction has been effected for preventing any degree of reduction in brake pipe pressure at a service rate following the limited reduction in said opposing fluid pressure from creating a sufficient differential from moving the mechanism to said emergency position.

24. In a fluid pressure brake, the combination with a brake pipe, of brake controlling valve mechanism subject to brake pipe pressure and an opposing pressure operated upon a reduction in brake pipe pressure at a service rate to a service position to effect a service application of the brakes and operative upon a reduction in brake pipe pressure at a rate exceeding a service rate to an emergency position to effect an emergency application of the brakes, and means cooperating with the mechanism in the service position for effecting a limited reduction in said opposing pressure at such a fast rate as to prevent the mechanism from moving to emergency position when in effecting a service application of the brakes the reduction in brake pipe pressure at a rate in excess of a service rate does not exceed a predetermined limited amount.

25. In a fluid pressure brake, the combination with a brake pipe, of brake controlling valve mechanism subject to brake pipe pressure and an opposing pressure operated upon a reduction in brake pipe pressure at a service rate to a service position to effect a service application of the brakes and operative upon a reduction in brake pipe pressure at a rate exceeding a service rate to an emergency position to effect an emergency application of the brakes, and means cooperating with the mechanism in the service position for effecting a limited reduction in said opposing pressure at such a fast rate as to prevent the mechanism from moving to emergency position when in effecting a service application of the brakes the reduction in brake pipe pressure at a rate in excess of a service rate does not exceed a predetermined limited amount, and means operating in the service position of the brake controlling valve mechanism to prevent the mechanism from moving to emergency position upon a reduction in brake pipe pressure in excess of said limited amount at a service rate.

26. In a fluid pressure brake, the combination with a brake pipe, of brake controlling valve mechanism operated upon a reduction in brake pipe pressure at a service rate to a service position to effect a service application of the brakes and operative upon a reduction in brake pipe pressure at a rate exceeding a service rate to an emergency position to effect an emergency application of the brakes, quick service reduction accelerating means operative in initiating a service application of the brakes to effect a limited amount of reduction in brake pipe pressure at a rate in excess of a service rate, and means cooperating with the mechanism in the service position for preventing the mechanism from moving to emergency position when in effecting a service application of the brakes the reduction in brake pipe pressure at a rate in excess of a service rate does not exceed said limited amount.

27. In a fluid pressure brake, in combination, a brake pipe, a chamber normally charged with fluid under pressure, a brake controlling valve mechanism subject to the opposing pressures of the brake pipe and said chamber and operative upon a service reduction in brake pipe pressure to a service position and upon an emergency reduction in brake pipe pressure to an emergency position, and means adapted in the service position of the brake controlling valve mechanism to first reduce the pressure of fluid in said chamber a limited amount at a fast rate to insure against movement of the brake controlling valve mechanism to emergency position if the service reduction in brake pipe pressure is at a rate in excess of a service rate and the reduction in brake pipe pressure does not exceed a predetermined amount, and to then vent fluid under pressure from said chamber at a slower rate to insure against movement of the brake controlling valve mechanism to emergency position if the rate of brake pipe reduction is decreased to a service rate while the mechanism is in service position and to insure movement of the brake controlling valve mechanism to emergency position if the reduction in brake pipe pressure is continued at a rate in excess of a service rate after the limited reduction in the pressure of fluid in said chamber has been effected.

28. In a fluid pressure brake, in combination, a brake pipe, a chamber normally charged with fluid under pressure, a brake controlling valve mechanism subject to the opposing pressures of the brake pipe and said chamber and operative upon a service reduction in brake pipe pressure to a service position and upon an emergency reduction in brake pipe pressure to an emergency position, and means adapted in the service position of the brake controlling valve mechanism to first vent a limited amount of fluid under pressure from the chamber at a rate such as to prevent the creation of a sufficient pressure differential on said mechanism to cause the mechanism to move from service position toward emergency position when the rate of a service reduction in brake pipe pressure exceeds a service rate and does not exceed a predetermined amount, and to then vent fluid under pressure from the chamber at a slower rate to prevent the creation of a sufficient pressure differential on said mechanism to cause the mechanism to move to emergency position when the limited reduction in chamber pressure has been effected and the reduction in brake pipe pressure is continued at a service rate and to insure the creation of a sufficient pressure differential on the mechanism to cause the mechanism to move to emergency position when the limited reduction in chamber pressure has been effected and the reduction in brake pipe pressure is continued at a rate in excess of a service rate.

29. In a fluid pressure brake, in combination, a brake pipe, a chamber normally charged with fluid under pressure, a brake controlling valve mechanism subject to the opposing pressures of the brake pipe and said chamber and operative upon a service reduction in brake pipe pressure to a service position and upon an emergency reduction in brake pipe pressure to an emergency position, and means adapted in the service position of the brake controlling valve mechanism to first vent a limited amount of fluid under pressure from said chamber at a fast rate and to then vent fluid under pressure from said chamber at a slower rate to insure against the brake controlling valve mechanism moving to emergency position upon a limited reduction in brake pipe pressure at a fast rate and the continued reduction in brake pipe pressure at a slower rate and to insure movement of the brake controlling valve mechanism to emergency position upon the continuation of the reduction in brake pipe pressure at a fast rate after said limited amount of fluid under pressure has been vented from said chamber at a fast rate.

FRANK B. THOMAS.